United States Patent [19]
Chu

[11] Patent Number: 5,765,758
[45] Date of Patent: Jun. 16, 1998

[54] SOLVENT SPRAYER FOR ASSEMBLING THE GOLF SHAFT AND GRIP

[76] Inventor: Anna Chu, No.4-2 East 4Th Street, K.E.P.Z. Kaohsiung, Taiwan

[21] Appl. No.: 685,298

[22] Filed: Jul. 23, 1996

[51] Int. Cl.$^6$ ................................................ A61M 11/02
[52] U.S. Cl. .......................... 239/369; 239/434; 239/526; 239/288
[58] Field of Search ................................ 239/8, 318, 310, 239/340, 525, 526, 434, 416.4, 416.5, 654, 369, 288

[56] References Cited

U.S. PATENT DOCUMENTS

| | | | |
|---|---|---|---|
| 4,640,461 | 2/1987 | Williams | 239/318 X |
| 4,860,795 | 8/1989 | Oten | 239/318 X |
| 5,186,388 | 2/1993 | Chapman et al. | 239/8 |
| 5,445,226 | 8/1995 | Scott et al. | 239/318 X |

FOREIGN PATENT DOCUMENTS 1351688  11/1987  U.S.S.R. ............................. 239/340

Primary Examiner—Kevin Weldon
Attorney, Agent, or Firm—Pro-Techtor International

[57] ABSTRACT

A Solvent Prayer for Assembling the Golf Shaft and Grip is an improvement to the conventional process by simplifying both the solvent painting step and air injecting step in one process, and that will make an even painting and spraying of the solvent and will produce a better looking for the golf club. The present invention has a cylinder socket seated onto the forward section of a nozzle to hold the upward end of the grip and when the top of the golf shaft with pre-winded adhesive tape approaches the opening of the grip, the operator can depress and open the button-switch allowing the high pressure air and sucked solvent mists evenly spread and inject into the internal wall of the grip that enable the top of the golf shaft to be smoothly and effectively planted into the grip.

1 Claim, 6 Drawing Sheets

SOLVENT SPRAYER FOR ASSEMBLING THE GOLF SHAFT AND GRIP

BACKGROUND OF THE INVENTION

As shown in FIG. 1, all golf shaft (90) is covered with a grip (80) for the convenience of swinging of the club free from dropping off the shaft. The conventional way of assembling the golf shaft (90) and the grip (80) is to paint a layer of solvent onto the dual-faced adhesive tape that is pre-winded on the grip area of golf shaft (90) and then using a sprayer to inject high pressure of air into the opening of the grip (80) to expand the grip (80) for planting the top of the golf shaft (90) into the grip (80) to achieve solid adhesion between the golf shaft (90) and the grip (80).

The assembling process for the golf shaft and grip described above is usually done by man-power to paint and spray the layer of solvent, which consumes considerable time, work force and costs and is often hard to achieve an even painting or spraying of the solvent and may diminish the solid adherence and the smooth appearance to the club. All of these defects will inevitably slow down the productivity of the assembling process and degrade the player's potential of swinging.

To overcome the aforesaid defects in conventional assembling process, the inventor arrived at the present invention, a solvent sprayer for assembling the golf shaft and grip, that not only can paint a layer of solvent but also can inject high pressure of air to expand the grip at the same time and, therefore, can save a lot of time and manpower by simplifying both the solvent painting step and air injecting step in one process, and that will make an even painting and spraying of the solvent and will produce a better looking for the golf club.

DESCRIPTION OF THE PREFERRED EMBODIMENTS

Figure 1:
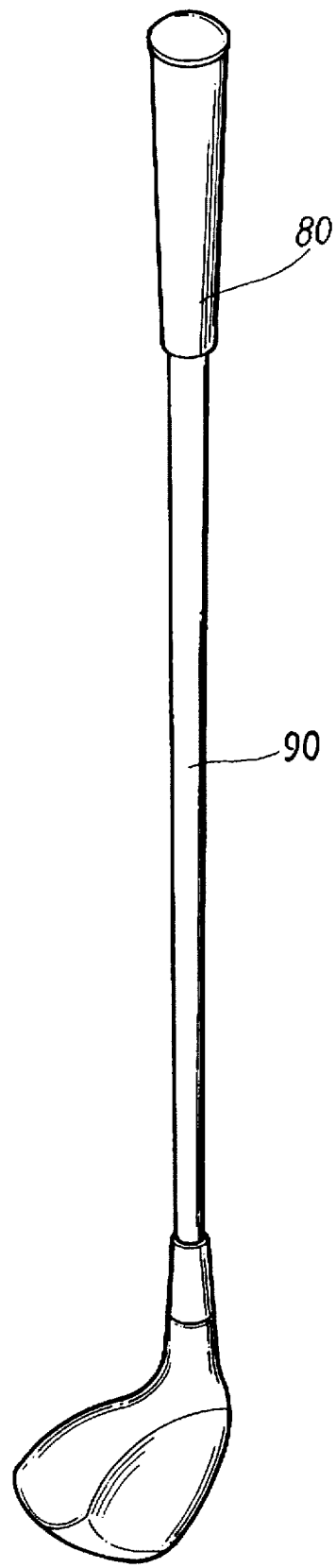
FIG. 1 is a front view of a golf club relating to the present invention.
Figure 2:
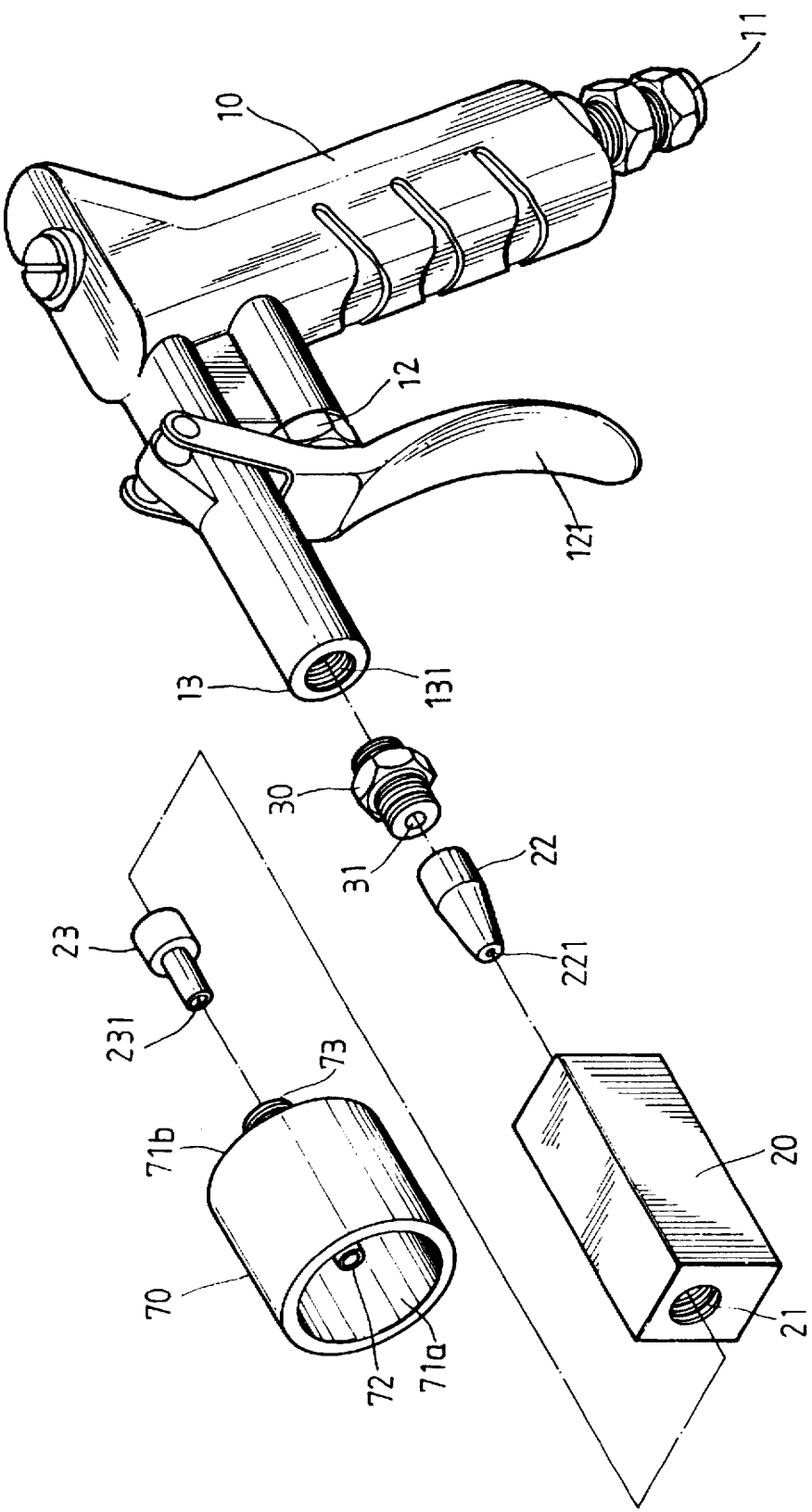
FIG. 2 is an exploded view of the embodiments of the present invention.
Figure 3:
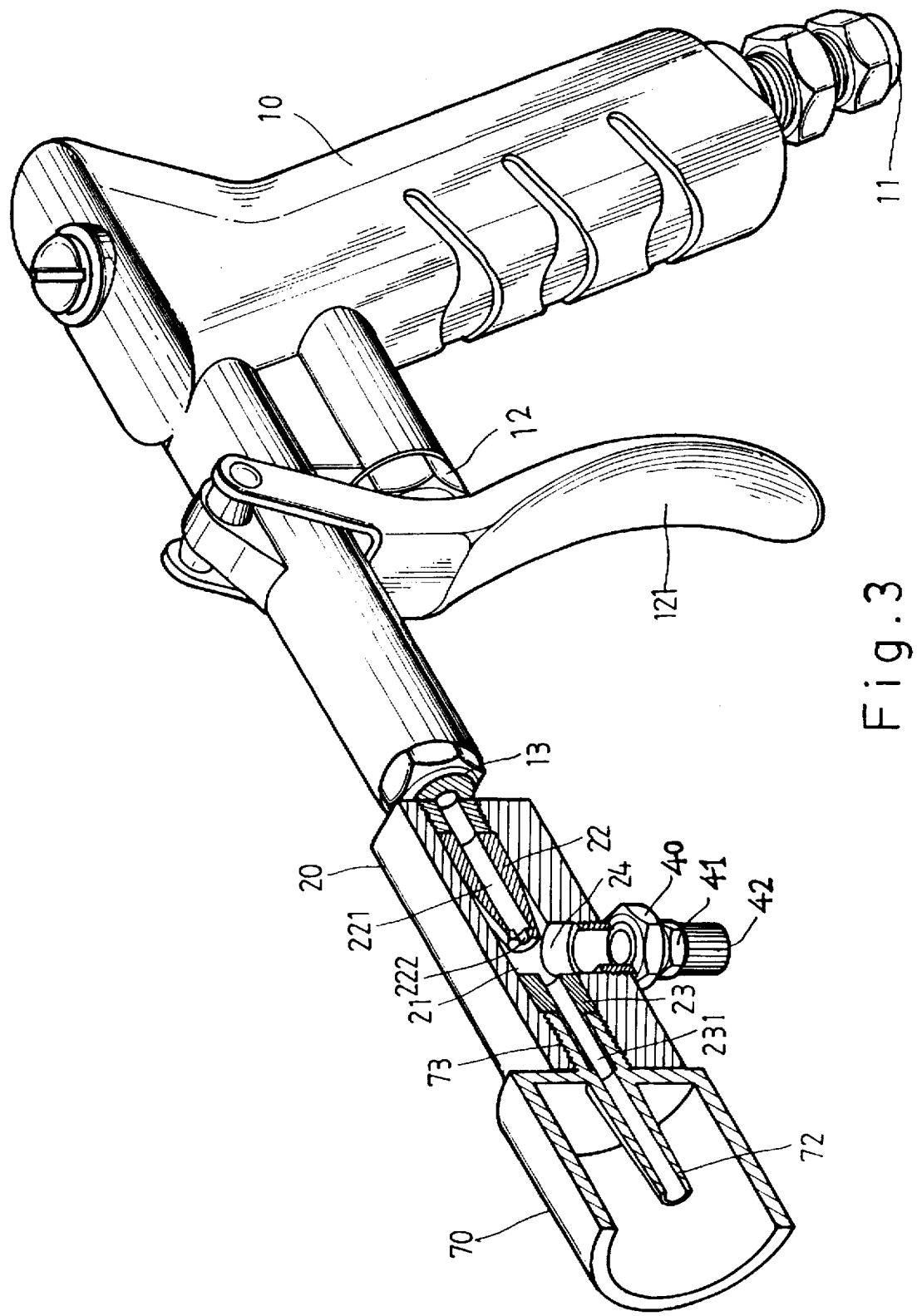
FIG. 3 is a partial section view of the assembled embodiments as shown of FIG. 2.
Figure 4:
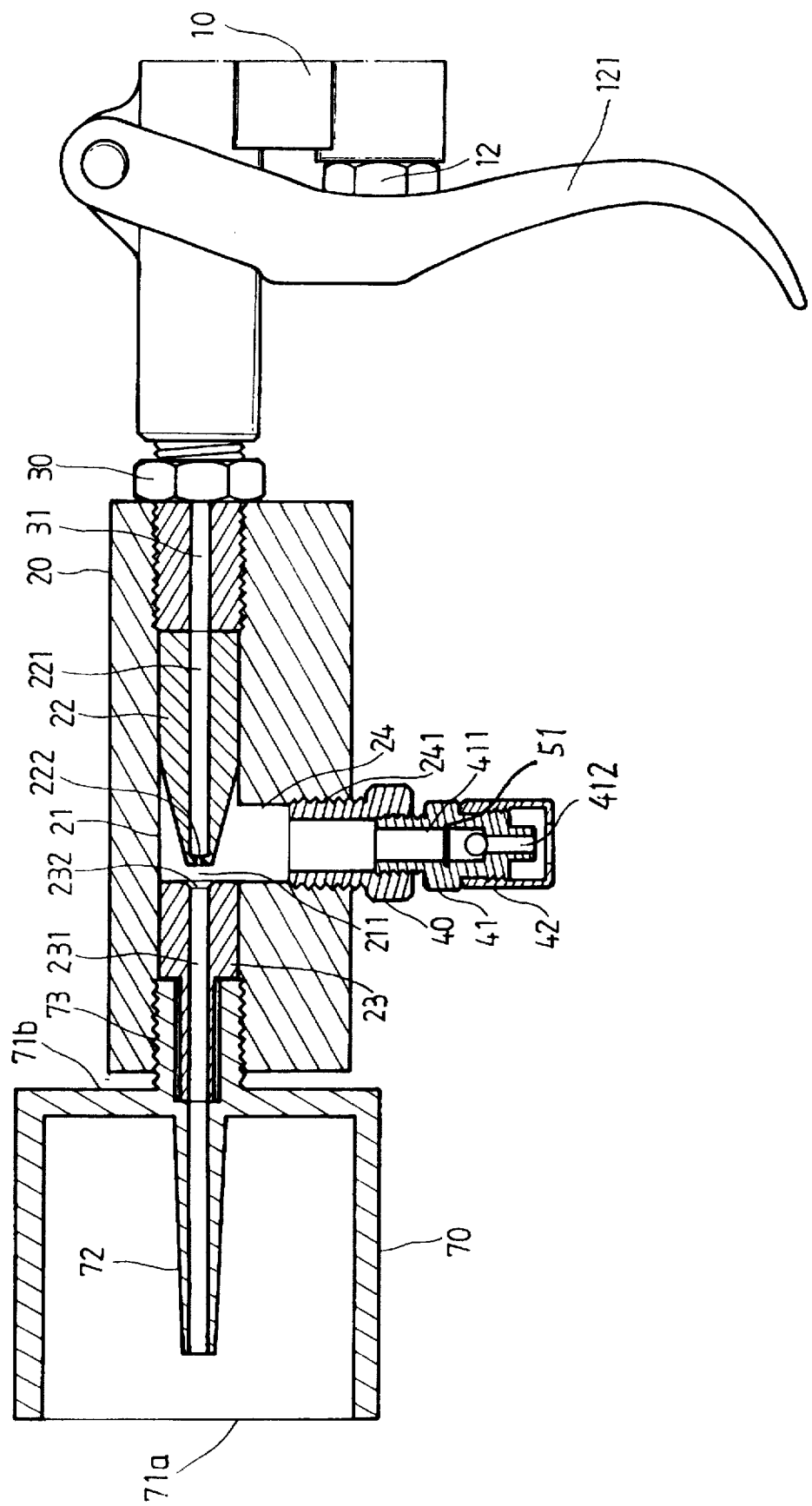
FIG. 4 is a side section view of the embodiments of the present invention.

As shown in FIG. 2, 3 and 4, the solvent sprayer of the present invention is composed of a back sector, an intermediate sector and a fore sector. The back sector has an ordinary sprayer element (10) that is provided with an air passage between an inlet (11) at the bottom and an outlet (13) at the forward end. Through the back and forth action of a button switch (12) that being depressed by a sub-holder (121) set aside the sprayer, the compressed air flow can be supplied and/or stopped from the inlet (11) to the outlet (13). A set of internal threads (131) is provided inside the outlet (13) for screw connection with the backward end of a hollow coupler (30), and the coupler (30) has an air path (31) inside it.

As shown in FIG. 2, 3 and 4, the intermediate sector of the present invention has a socket connector (20) which is run through with a center passage (21), and internal threads are provided at both ends of the center passage (21) for screw connection purposes later. A front hollow block (23) with an indented external surface for the forward part and a conical rear hollow block (22), both have an external diameter corresponding to the internal diameter of the socket connector (20), are tightly pressed into the front end and the rear end of the center passage (21) respectively. Each of the hollow blocks (23) and (22) has an internal air passage (231) and (221) and, more specifically, the forward part of the air passage (221) contracts to form a thinner air outlet (222) and the backward part of the air passage (231) expands into an internal conical opening (232). Between the contracted air outlet (222) and the internal conical opening (232), a fine gap (211) is formed inside the socket connector (20) when the two hollow blocks (22) and (23) are inserted from the ends of the socket connector (20). Right under the gap (211), the center passage (21) is further provided with a by-pass solvent passage (24) which is open downward and is perpendicular to the center passage (21), and that creates three-way passages inside of the socket connector (20). A set of internal threads is provided at the downward end of the solvent passage (24) to vertically connect the upward end of a sub-hollow coupler (40) by corresponding threads. The downward end of the sub-hollow coupler (40) has internal threads for screw connection with the upward end of a hollow adapter (41) by corresponding threads; and a control knob (42) is further connected over the downward end of the hollow adapter (41). The hollow adapter (41) has an inner passage (411) for the solvent to pass through, and the inner passage (411) contracts into a thinner passage (412) at its downward part. The outer diameter of the downward end of the hollow adapter (41) is smaller for connecting the upward end of a tube (50). A horizontal bar (51) lay across the inner passage (411) and a rolling ball (52) function as a set of counter-force valve. Another hollow adapter (53) with a center passage is connector to the downward end of the tube (50); and another horizontal bar (532) laid across the inside of the hollow adapter (53) and another rolling ball (531) function as another set of counter-force valve.

As shown in FIG. 2, 3 and 4, the fore sector mainly contains a cylinder socket (70) with an opening (71a) heading forward and a closing bottom (71b). At the center of the closing bottom (71b), a protruding hollow connector (73) with outer threads is provided, and a nozzle (72), that is opposite to the connector (73), is extended forward of the cylinder socket (70).

Referring to FIG. 2 and FIG. 3, the embodiments for the present invention is composed of the sprayer element (10) with internal thread (131) at the outlet (13) for screw connection with the backward end of the socket connector (20) through the hollow coupler (30); and the forward end of the socket connector (20) is connected to the hollow connector (73) of the backward end of the cylinder socket (70) by corresponding threads. When the above elements are connected to each other, a unique air passage from the outlet (13) to the nozzle (72) is available for the highly compressed air to flow.

Figure 5:
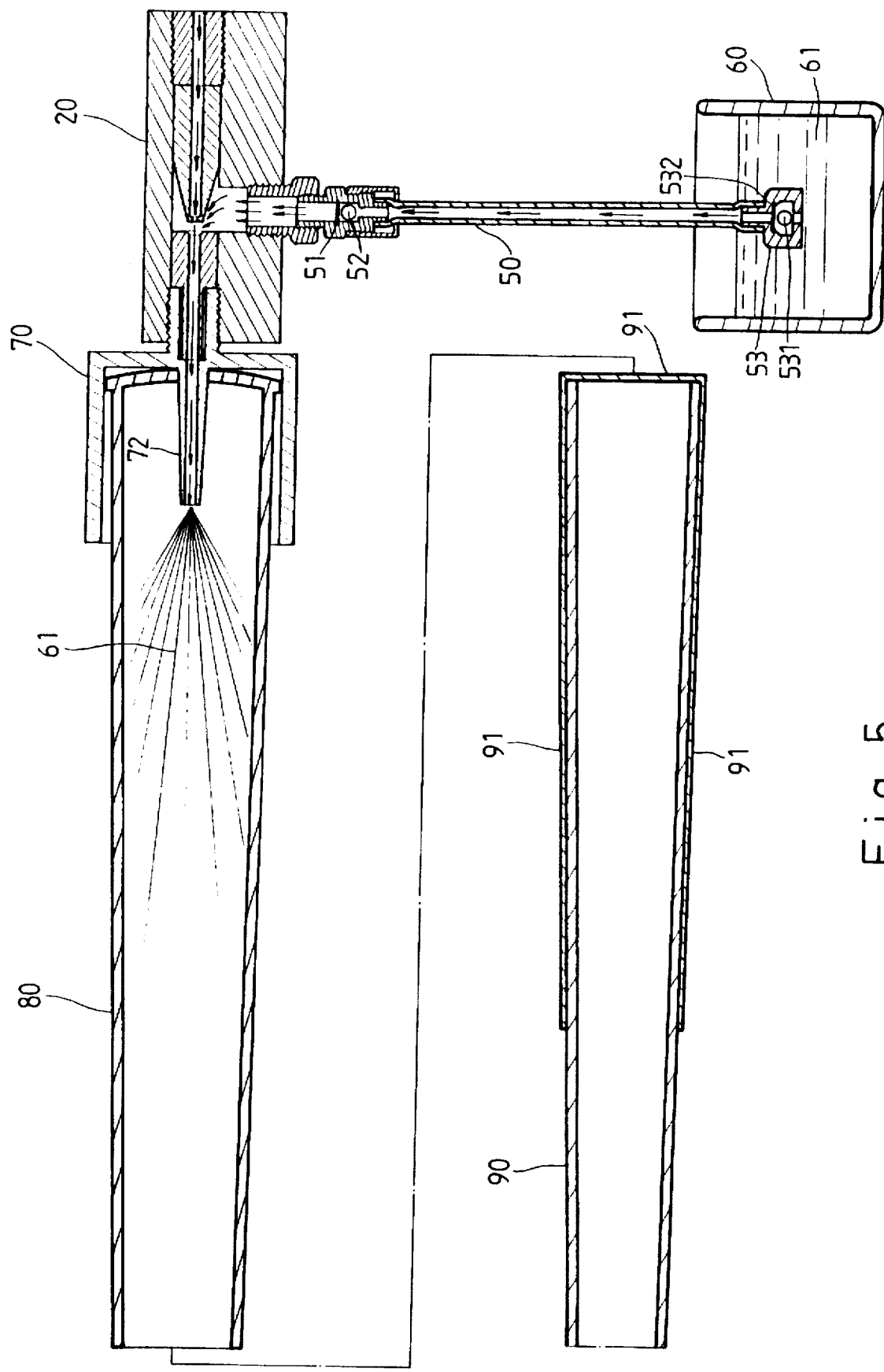
FIG. 5 is a conceptual view of operation of the present invention.
Figure 6:
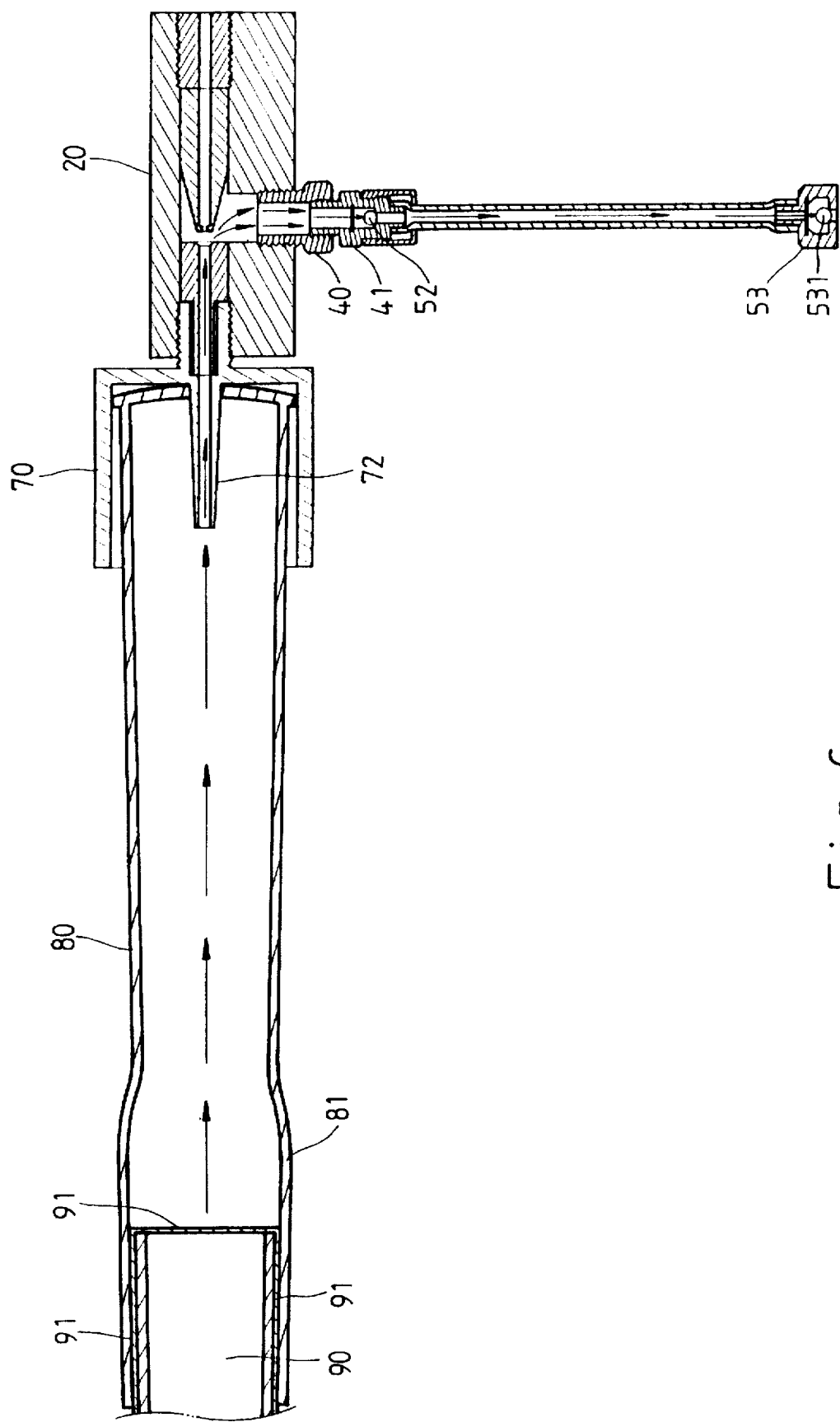
FIG. 6 is an additional conceptual view of operation of the present invention.

Referring to FIGS. 5 and 6, a detailed description of the assembling and operating process for the present invention follows: When the pre-winded golf shaft (90) with dual-faced adhesive tape (91) is fitted at an assembly stand, the operator may hold the sprayer (10) and put the downward end of tube (50) into the liquid solvent (61) in container (60); and then move the top of the grip (80) into the cylinder socket (70) and onto the nozzle (72) till full entry against the closing bottom (71b) of the cylinder socket (70). When the grip is solidly fitted onto the nozzle element (70), the operator may depress the button switch (12) by pulling the sub-holder (121) backward to induct the compressed air from the inlet (11) to the outlet (13). When the compressed air flow in passage (221) is jammed by the contracted outlet (222) as shown by the symbol arrow, the compressed air flow suddenly lowers its speed. But when the jammed air pressure runs off the contracted outlet (222) against the conical opening (232) through the fine gap (211), the suddenly expended camber around the fine gap (221) produces a powerful suction to suck up the solvent (61) from the container (60) to the fine gap (221) through tube (50). When the solvent (61) is sucked into the fine gap (211) to mix with the fast air flow, a solvent mist will be produced and be sent to the nozzle (72) through passage (231). When the solvent mist is evenly sprayed against the internal wall of the grip (80) as shown in FIG. 5, it is the right time to put the mouth of the grip (80) onto the top of the golf shaft (90). When the top of the shaft (90) with pre-winded adhesive tape enters the mouth of the grip (80), the grip (80) is sealed and shall be expanded by the injected high pressure air from the nozzle (72) and in turn the high pressure air in passage (221) shall produce a reverse pressure, as shown in FIG. 6, upon the rolling balls (52) and (531) to force the said rolling balls (52) and (531) tightly against the outlets underneath to deny the reverse force and cease the supply of solvent (61). In the meantime, when the solvent passage is closed and the grip (80) is expanded by the injected pressure(81), it is the right time to wear the grip(80) with even solvent (61) inside onto the golf shaft(90) with pre-winded dual-faced adhesive tape(91). By the assembling and operating process illustrated above, the present invention can improve higher productivity and better quality accordingly.

I claim:

1. A solvent sprayer for assembling a golf club shaft and a golf club grip comprising:

(a) a rear section comprising a sprayer element containing an air passage between an inlet at a lower end of said sprayer element and an outlet at a froward end of said rear section, and a button switch that is activated by a trigger, said outlet includes internal threads to receive a hollow coupler, said coupler including an air path therein;

(b) an intermediate section comprising a socket connector with a central air passage, said socket connector includes internal threads at each of two ends of said central air passage, a front hollow block with a central passage therein, said front hollow block is received in a front end of said socket connector, and a conical rear hollow block with a central passage therein, said rear hollow block is received in a rear end of said socket connector, said socket connector includes means to receive a solvent passage to supply solvent to the solvent sprayer, said intermediate section is connected to said rear section, and (c) a front section comprising a cylinder socket with an open forward end and a closed rearward end, said cylinder socket includes therein a central nozzle with an air passage therein, an inner diameter of said cylinder socket is as large as the outer diameter of the golf club grip, said front section is connected to said intermediate section; such that during an assembly process, a user inserts a top of the golf club grip into said cylinder socket such that the golf club grip abuts said closed rearward end of said cylinder socket, said button switch is then activated to start a flow of solvent through the solvent sprayer, the solvent being sprayed in a mist onto the golf club grip, the golf club shaft then being partially inserted into the golf club grip, thereby sealing an open end of the golf club grip, thus causing air pressure from the solvent sprayer to expand the golf club grip, thereby facilitating complete insertion of the golf club shaft into the golf club grip.

* * * * *